United States Patent
Bajpai et al.

(10) Patent No.: US 9,734,156 B1
(45) Date of Patent: Aug. 15, 2017

(54) SYSTEMS AND METHODS FOR LEVERAGING DATA-DEDUPLICATION CAPABILITIES OF FILE SYSTEMS

(71) Applicant: Symantec Corporation, Mountain View, CA (US)

(72) Inventors: Vishal Bajpai, Roseville, MN (US); Preeti Agarwal, Maharashtra (IN)

(73) Assignee: Veritas Technologies, Mountain View, CA (US)

( * ) Notice: Subject to any disclaimer, the term of this patent is extended or adjusted under 35 U.S.C. 154(b) by 631 days.

(21) Appl. No.: 14/026,980

(22) Filed: Sep. 13, 2013

(51) Int. Cl.
*G06F 17/30* (2006.01)

(52) U.S. Cl.
CPC .............................. *G06F 17/30156* (2013.01)

(58) Field of Classification Search
None
See application file for complete search history.

(56) References Cited

U.S. PATENT DOCUMENTS

| | | | |
|---|---|---|---|
| 7,765,160 B2* | 7/2010 | Niles ................... | G06F 11/1453 705/28 |
| 8,055,614 B1 | 11/2011 | Vaikar | |
| 8,392,437 B2 | 3/2013 | Mukherjee et al. | |
| 2006/0179083 A1* | 8/2006 | Kulkarni .............. | G06F 11/1451 |
| 2009/0198649 A1* | 8/2009 | Vaughan ........... | G06F 17/30312 |
| 2010/0094817 A1* | 4/2010 | Ben-Shaul ............ | G06F 3/0608 707/697 |
| 2011/0004612 A1* | 1/2011 | Boyersmith .............. | G06F 8/35 707/769 |
| 2011/0161327 A1* | 6/2011 | Pawar ............... | G06F 17/30997 707/741 |

OTHER PUBLICATIONS

"Single Instance Storage (SIS)", https://technet.microsoft.com/e-nus/library/gg232683(v=ws.10).aspx, as accessed Aug. 7, 2013, Microsoft, (Feb. 7, 2011).
"Data Protection Manager (DPM)", https://technet.microsoft.com/en-us/library/hh758173.aspx, as accessed Aug. 7, 2013, Microsoft, (Jan. 21, 2012).
"Simpana Software", http://www.commvault.com/simpana-software, as accessed Aug. 7, 2013, Commvault, (Jul. 5, 2012).

(Continued)

*Primary Examiner* — Sangwoo Ahn
(74) *Attorney, Agent, or Firm* — FisherBroyles LLP

(57) ABSTRACT

A computer-implemented method for leveraging data-deduplication capabilities of file systems may include (1) detecting a backup operation that backs up at least one data segment maintained by a file system capable of performing data deduplication on a computing device, (2) querying the file system for file-system data that includes (i) the data segment to be backed up during the backup operation, (ii) at least one unique identifier that identifies the data segment, and (iii) at least one file-specific segment map that identifies a position of the data segment relative to at least one other data segment within a file, (3) receiving the file-system data from the file system in response to the query, and then (4) providing the file-system data to a deduplication server to facilitate backing up the file based at least in part on the file-system data. Various other methods, systems, and computer-readable media are also disclosed.

18 Claims, 8 Drawing Sheets

(56) References Cited

OTHER PUBLICATIONS

"Data Domain", http://www.emc.com/data-protection/data-domain/index.htm, as accessed Aug. 7, 2013, EMC Corporation, (Apr. 3, 2014).

"Avamar", http://www.emc.com/data-protection/avamar.htm, as accessed Aug. 7, 2013, EMC Corporation, (on or before Aug. 7, 2013).

* cited by examiner

File-Specific Segment Map
126

FILE: Example.doc

| POSITION | UNIQUE IDENTIFIER OF DATA SEGMENT |
|---|---|
| 1 | 0x473AEC1F |
| 2 | 0xAA219BC3 |
| 3 | 0x758D21CA |
| 4 | 0x67BA3210 |
| 5 | 0x8BB1C120 |

*FIG. 5*

SYSTEMS AND METHODS FOR LEVERAGING DATA-DEDUPLICATION CAPABILITIES OF FILE SYSTEMS

BACKGROUND

Data deduplication often reduces the amount of storage space needed to store backup images by identifying redundant data segments within similar files. For example, a backup and restore technology may capture a backup image of a client device and identify various data segments included in both the backup image and a remote deduplication server. Rather than storing multiple instances of the data segments to the remote deduplication server, the backup and restore technology may configure the backup image to simply reference the data segments already stored on the remote deduplication server. By configuring the backup image to reference the data segments already stored on the remote deduplicated storage, the backup and restore technology may reduce the amount of storage space needed to store the backup image on the remote deduplication server.

Unfortunately, while conventional backup and restore technologies may reduce the amount of storage space needed to store backup images, these backup and restore technologies may still have certain shortcomings and/or inefficiencies. For example, a client device's file system may generate hashes of data segments to perform localized data deduplication on the client device. However, even though the client device's file system has already generated such hashes, a conventional backup and restore technology may generate hashes of the same data segments to perform network-wide data deduplication. By generating hashes of the same data segments as the client device's file system, the conventional backup and restore technology may superfluously consume resources (such as processing power and/or computing time) that could be dedicated to one or more other computing tasks.

As such, the instant disclosure identifies and addresses a need for systems and methods for leveraging data-deduplication capabilities of file systems.

SUMMARY

As will be described in greater detail below, the instant disclosure generally relates to systems and methods for leveraging data-deduplication capabilities of file systems by querying file systems for file-system data that facilitates backing up files to deduplication servers.

In one example, a computer-implemented method for leveraging data-deduplication capabilities of file systems may include (1) detecting a backup operation that backs up at least one data segment maintained by a file system capable of performing data deduplication on a computing device, (2) querying the file system for file-system data that includes (i) the data segment to be backed up during the backup operation, (ii) at least one unique identifier that identifies the data segment, and (iii) at least one file-specific segment map that identifies, based at least in part on the unique identifier, a position of the data segment relative to at least one other data segment within a file, (3) receiving the file-system data from the file system in response to the query, and then (4) providing the file-system data to a deduplication server to facilitate backing up the file based at least in part on the file-system data.

In some examples, the unique identifier may be generated by the file system. In such examples, the method may also include synchronizing the file system and the deduplication server with respect to a unique-identifier algorithm to enable the deduplication server to interpret the unique identifier generated by the file system. Additionally or alternatively, the method may include synchronizing the file system and the deduplication server with respect to a segment size that defines a size of the data segment.

In some examples, the method may also include providing an Application Programming Interface (API) that facilitates querying the file system for the file-system data. For example, the method may include implementing a plugin that extends a pre-existing API of the file system. Additionally or alternatively, the method may include issuing a request for the file-system data based at least in part on the API.

In some examples, the method may also include detecting an incremental backup operation that backs up the data segment due at least in part to at least one change that occurred in the data segment since a most recent backup operation performed on the file system. Additionally or alternatively, the method may include detecting a full backup operation that backs up the data segment along with all other data segments maintained by the file system.

In some examples, the method may also include querying the file system to identify each data segment that has changed since a most recent backup operation performed on the file system. Additionally or alternatively, the method may include forgoing generating the unique identifier from the data segment due at least in part to the unique identifier being included in the file-system data received from the file system.

In some examples, the method may also include deduplicating at least a portion of the file-system data with respect to network-wide data stored on the deduplication server. For example, the method may include providing, to the deduplication server, a list of unique identifiers that identify one or more data segments that have changed since a most recent backup operation performed on the file system. In this example, the method may include receiving, from the deduplication server, a list of globally unique identifiers that identify one or more of the changed data segments as not yet having been updated at the deduplication server. The method may additionally include identifying, in the list of globally unique identifiers, the unique identifier that identifies the data segment to be backed up during the backup operation. Finally, the method may include providing the data segment and the file-specific segment map to the deduplication server to facilitate backing up the file.

In some examples, the file-system data may include a set of data segments maintained by the file system on the computing device and a list of unique identifiers that identify the data segments. In such examples, the method may also include enabling the deduplication server to deduplicate at least a portion of the file-system data. For example, the method may include comparing the list of unique identifiers included in the file-system data with a list of globally unique identifiers that identify one or more data segments already stored at the deduplication server. In this example, the method may further include identifying, based at least in part on the comparison, at least one data segment that is duplicated across the data segments included in the file-system data and the data segments already stored at the deduplication server. Finally, the method may include deduplicating the data segment at the deduplication server by refusing to store a duplicate instance of the data segment despite being included in the file-system data.

In some examples, the method may also include restoring the data segment to the file system during a restore operation. For example, the method may include receiving, from the deduplication server, a list of identifiers that identify one or more data segments that need to be restored to the file system during the restore operation. In this example, the method may further include providing the list of identifiers to the file system and then receiving, from the file system, a list of unique identifiers that identify a single instance of each data segment to be restored to the file system during the restore operation. The method may additionally include identifying, in the list of unique identifiers, the unique identifier that identifies the data segment backed up during the backup operation. Moreover, the method may include obtaining, from the deduplication server in response to identifying the unique identifier, restore data that includes the data segment and the file-specific segment map. Finally, the method may include providing the restore data to the file system to facilitate restoring the file based at least in part on the restore data.

In one embodiment, a system for implementing the above-described method may include (1) a detection module that detects a backup operation that backs up at least one data segment maintained by a file system capable of performing data deduplication on a computing device, (2) a query module that (a) queries the file system for file-system data that includes (i) at least one unique identifier that identifies the data segment and (ii) at least one file-specific segment map that identifies, based at least in part on the unique identifier, a position of the data segment relative to at least one other data segment within a file, and (b) receives the file-system data from the file system in response to the query, and (3) a provisioning module that provides the file-system data to a deduplication server to facilitate backing up the file based at least in part on the file-system data. The system may also include at least one processor configured to execute the detection module, the query module, and the provisioning module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) detect a backup operation that backs up at least one data segment maintained by a file system capable of performing data deduplication on a computing device, (2) query the file system for file-system data that includes (i) the data segment to be backed up during the backup operation, (ii) at least one unique identifier that identifies the data segment, and (iii) at least one file-specific segment map that identifies, based at least in part on the unique identifier, a position of the data segment relative to at least one other data segment within a file, (3) receive the file-system data from the file system in response to the query, and then (4) provide the file-system data to a deduplication server to facilitate backing up the file based at least in part on the file-system data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary file-specific segment map that identifies the position of each data segment within a file.

Figure 1:
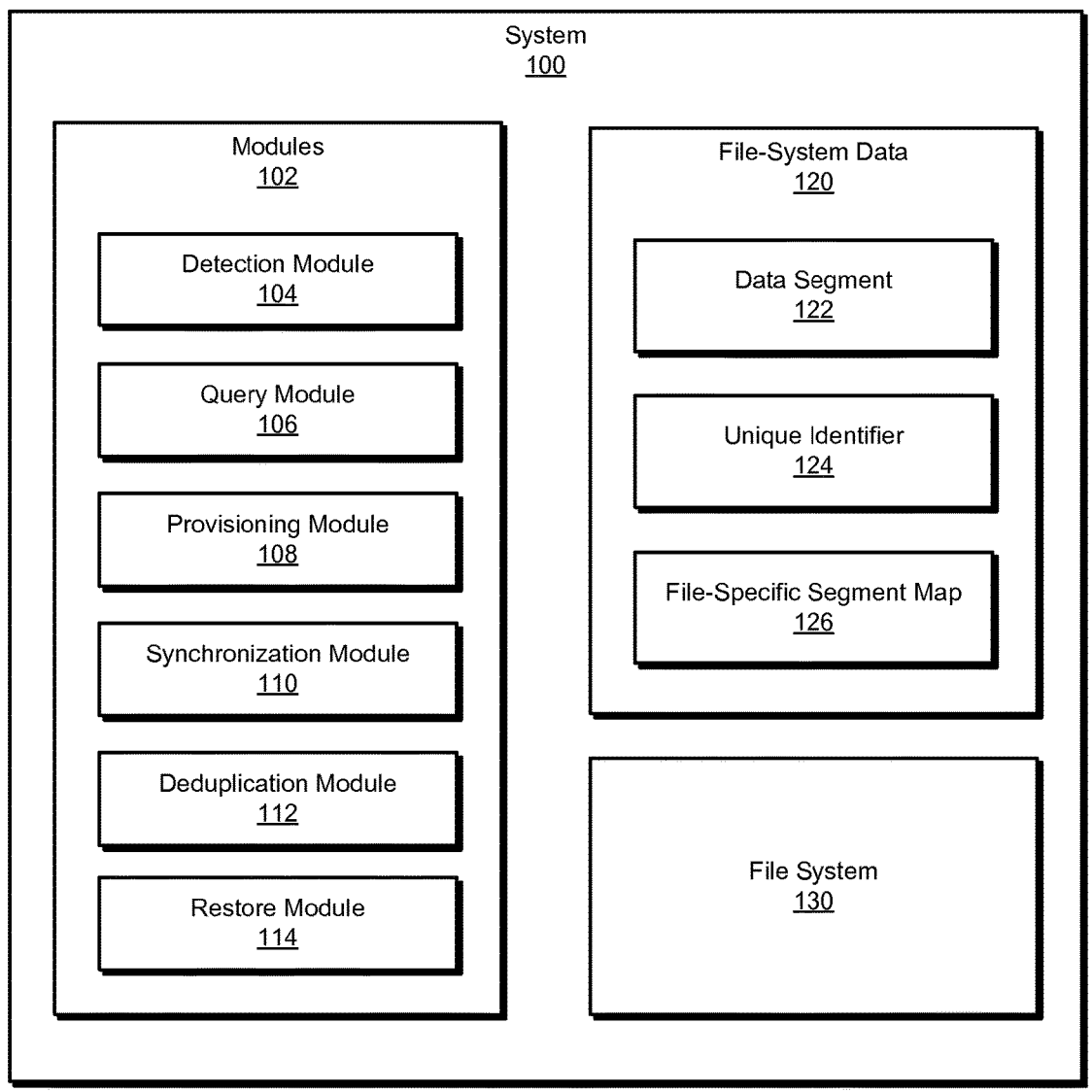
FIG. 1 is a block diagram of an exemplary system for leveraging data-deduplication capabilities of file systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for leveraging data-deduplication capabilities of file systems. As will be explained in greater detail below, by querying a file system capable of performing localized data deduplication on a computing device, the various systems and methods described herein may obtain file-system data that facilitates backing up unique data segments to a deduplication server. By obtaining such file-system data from the file system, the various systems and methods described herein may achieve network-wide data deduplication on the deduplication server without performing certain processes and/or tasks that have already been performed by the file system (e.g., redundantly generating hashes of the unique data segments). As a result, the various systems and methods described herein may help conserve various computing resources (such as processing power and/or computing time) while achieving network-wide data deduplication on the deduplication server.

Figure 2:
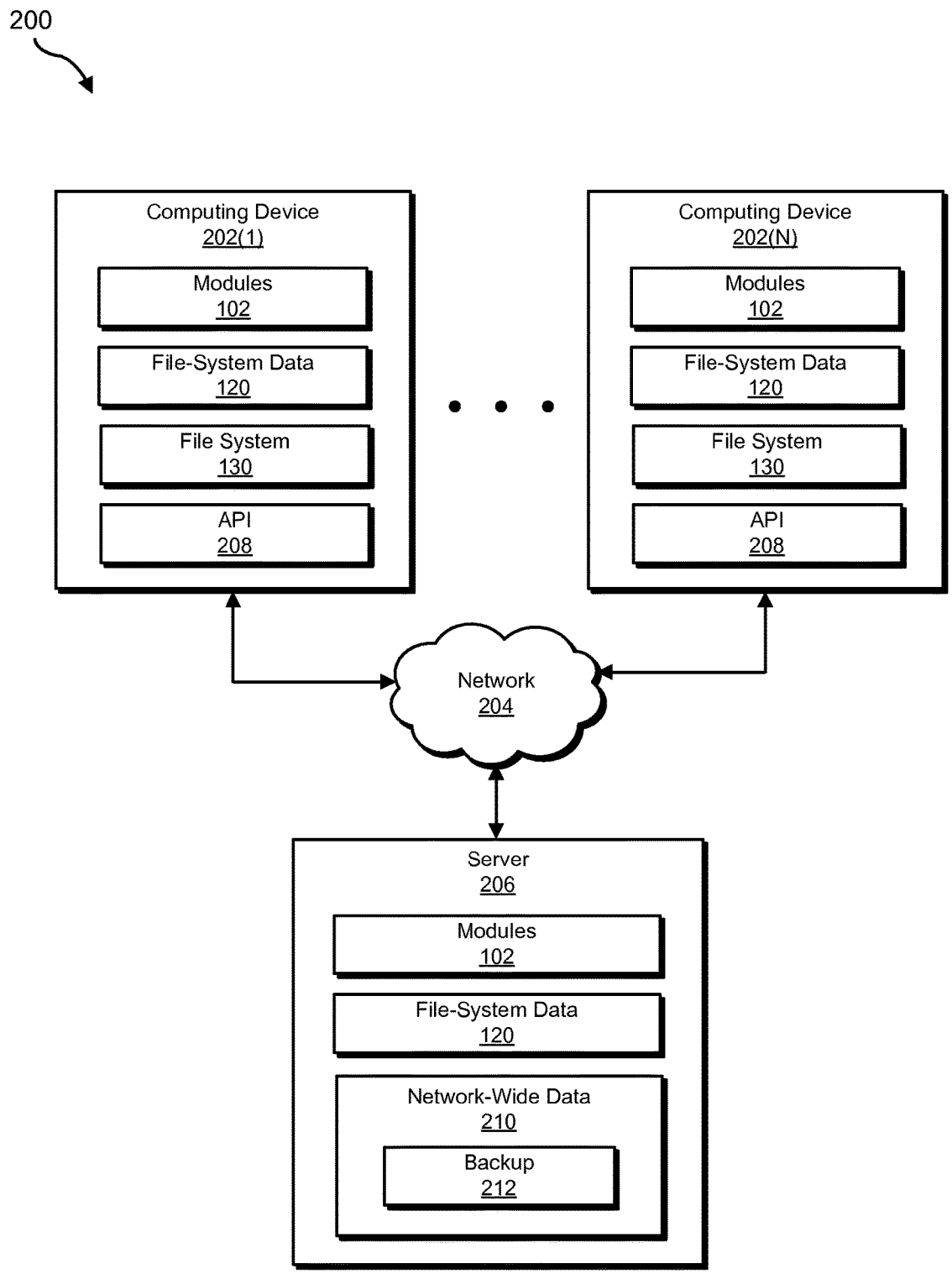
FIG. 2 is a block diagram of an additional exemplary system for leveraging data-deduplication capabilities of file systems.

The following will provide, with reference to FIGS. 1-2, detailed descriptions of exemplary systems for leveraging data-deduplication capabilities of file systems. Detailed descriptions of corresponding computer-implemented methods will be provided in connection with FIGS. 3 and 6. Detailed descriptions of an exemplary data segment and an exemplary unique identifier will be provided in connection with FIG. 4. Detailed descriptions of exemplary file-specific segment maps will be provided in connection with FIG. 5. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for leveraging data-deduplication capabilities of file systems. As illustrated in this figure, exemplary system 100 may include one or more modules 102 for performing one or more tasks. For example, and as will be explained in greater detail below, exemplary system 100 may include a detection module 104 that detects a backup operation that backs up at least one data segment maintained by a file system capable of performing data deduplication on a computing device. Exemplary system 100 may also include a query module 106 that (1) queries the file system for file-system data that includes (a) the data segment to be backed up during the backup operation, (b) at least one unique identifier that identifies the data segment, and (c) at least one file-specific segment map that identifies, based at least in part on the unique identifier, a position of the data segment relative to at least one other data segment within a file and then (2) receives the file-system data from the file system in response to the query.

In addition, and as will be described in greater detail below, exemplary system 100 may include a provisioning module 108 that provides the file-system data to a deduplication server to facilitate backing up the file based at least in part on the file-system data. Exemplary system 100 may further include a synchronization module 110 that synchronizes the file system and the deduplication server with respect to a unique-identifier algorithm and/or a segment size that defines the size of the data segment.

As will be described in greater detail below, exemplary system 100 may also include a deduplication module 112 that deduplicates at least a portion of the file-system data with respect to network-wide data stored on the deduplication server. Exemplary system 100 may further include a restore module 114 that restores the data segment to the file system during a restore operation. Although illustrated as separate elements, one or more of modules 102 in FIG. 1 may represent portions of a single module or application (such as SYMANTEC BACKUP EXEC, SYMANTEC NETBACKUP, SYMANTEC NORTON GHOST, ACRONIS TRUE IMAGE, ACRONIS BACKUP & RECOVERY, GENIE BACKUP HOME, or COMMVAULT SIMPANA).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more file systems, such as file system 130. The phrase "file system," as used herein, generally refers to any type or form of computing component capable of maintaining, storing, retrieving, updating, and/or deduplicating one or more data segments and/or files. Examples of file system 130 include, without limitation, File Allocation Table (FAT) file systems (such as FAT12, FAT16, and FAT32), VERITAS file systems, ZFS file systems, hierarchical file systems, UNIX file systems, journaling file systems, disk file systems, flash file systems, tape file systems, database file systems, transactional file systems, network file systems, shared disk file systems, special file systems, device file systems, virtual file systems, combinations of one or more of the same, or any other type of suitable file system.

In one example, file system 130 may be configured to perform localized data deduplication on a computing device. The phrase "data deduplication," as used herein, generally refers to any type or form of process and/or procedure for identifying multiple instances of the same data segment and then consolidating these instances into a single instance of the data segment. Accordingly, the phrase "localized data deduplication," as used herein, generally refers to any type or form of data deduplication performed on the data segments maintained by a file system on a client device. This localized data deduplication may include block-level and/or file-level data deduplication.

As illustrated in FIG. 1, exemplary system 100 may also include various data and/or information, such as file-system data 120. The phrase "file-system data," as used herein, generally refers to any type or form of data, metadata, and/or information that facilitates backing up one or more files to a deduplication server. In one example, file-system data 120 may include a data segment 122, a unique identifier 124 that identifies data segment 122, and/or a file-specific segment map 126 that identifies a position of data segment 122 relative to at least one other data segment within a file.

The phrase "data segment," as used herein, generally refers to any segment of data that represents at least a portion of a file. In one example, data segment 122 may have been deduplicated by file system 130 on a computing device. In this example, data segment 122 may represent a unique data segment stored on the computing device.

The phrase "unique identifier," as used herein, generally refers to any type or form of identifier that uniquely identifies a data segment. In one example, unique identifier 124 may be used by file system 130 to identify, locate, and/or deduplicate data segment 122 on a computing device. Examples of unique identifier 124 include, without limitation, hashes, fingerprints, checksums, MD5 checksums, secure hash algorithms, digital signatures, references, pointers, combinations of one or more of the same, or any other suitable unique identifier.

The phrase "file-specific segment map," as used herein, generally refers to any type or form of data, metadata, and/or information that identifies the positioning and/or ordering of data segments within a specific file. In one example, file-specific segment map 126 may map or otherwise indicate the position of data segment 122 relative to at least one other data segment within a specific file. In this example, file-specific segment map 122 may reference data segment 122 based at least in part on unique identifier 124.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. Computing devices 202(1)-(N) may each be programmed with one or more of modules 102, file system 130, and/or API 208. Computing devices 202(1)-(N) may also maintain and/or store file-system data 120.

The term "API," as used herein, generally refers to any type or form of library or set of functions and/or routines that facilitate interfacing with and/or performing specific tasks on a file system. API 208 may enable query module 106 to query file system 130 for file-system data 120. In one example, API 208 may be provided via a plugin that extends a pre-existing API of file system 130. In this example, query module 106 may issue a request for file-system data 120 based at least in part on API 208 provided via the plugin.

Additionally or alternatively, API 208 may enable synchronization module 110 to synchronize file system 130 and server 206 with respect to a unique-identifier algorithm and/or a segment size that defines the size of data segment 122. In one example, synchronization module 110 may issue a request to synchronize the unique-identifier algorithms of file system 130 and server 206 based at least in part on API 208 provided via the plugin. In another example, synchronization module 110 may issue a request to synchronize the segment size used by file system 130 and server 206 based at least in part on API 208 provided via the plugin.

As shown in FIG. 2, server 206 may be programmed with one or more of modules 102. Server 206 may also maintain and/or store file-system data 120 and/or network-wide data 210. The phrase "network-wide data," as used herein, generally refers to any type or form of data, metadata, and/or information collected across multiple computing devices and backed up to a deduplication server. In one example, network-wide data 210 may include data segments that have been backed up by computing devices 202(1)-(N) to server 206. In this example, each of the data segments may represent a unique data segment stored on server 206.

As shown in FIG. 2, network-wide data 210 may also include a backup 212. The term "backup," as used herein, generally refers to any type or form of file and/or image that includes the data, metadata, and/or information that facilitates restoring one or more files to a computing device. In one example, backup 212 may include file-system data 120 that has been deduplicated with respect to network-wide data 210. In this example, backup 212 may include data segment 122, unique identifier 124, and/or file-specific segment map 126. Examples of backup 212 include, without limitation, full backups, incremental backups, differential backups, accelerated backups, deduplicated backups, synthetic backups, snapshots, combinations of one or more of the same, or any other suitable backup.

In one embodiment, one or more of modules 102 from FIG. 1 may, when executed by at least one processor of computing device 202(1) and/or server 206, enable computing devices 202(1)-(N) and/or server 206 to leverage the data-deduplication capabilities of file systems. For example, and as will be described in greater detail below, one or more of modules 102 may cause at least one of computing devices 202(1)-(N) and/or server 206 to (1) detect a backup operation that backs up data segment 122 maintained by file system 130, (2) query file system 130 for file-system data 120 that includes (i) data segment 122, (ii) unique identifier 124 that identifies data segment 122, and (iii) file-specific segment map 126 that identifies, based at least in part on unique identifier 124, a position of data segment 122 relative to at least one other data segment within a specific file, (3) receive file-system data 122 from file system 124 in response to the query, and then (4) provide file-system data 122 to server 206 to facilitate backing up the specific file based at least in part on file-system data 122.

Computing devices 202(1)-(N) generally represents any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device.

Server 206 generally represents any type or form of computing device capable of backing up, deduplicating, and/or restoring data segments and/or files. Examples of server 206 include, without limitation, deduplication servers, application servers, web servers, storage servers, security servers, and/or database servers configured to run certain software applications and/or provide various deduplication, web, storage, security, and/or database services. Server 206 may be configured to perform network-wide data deduplication on data segments backed up from computing devices 202(1)-(N). The phrase "network-wide data deduplication," as used herein, generally refers to any type or form data deduplication performed on network-wide data collected from multiple client devices (e.g., computing devices 202(1)-(N) in FIG. 2). This network-wide data deduplication may include block-level and/or file-level data deduplication.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication among computing devices 202(1)-(N) and server 206.

Figure 3:
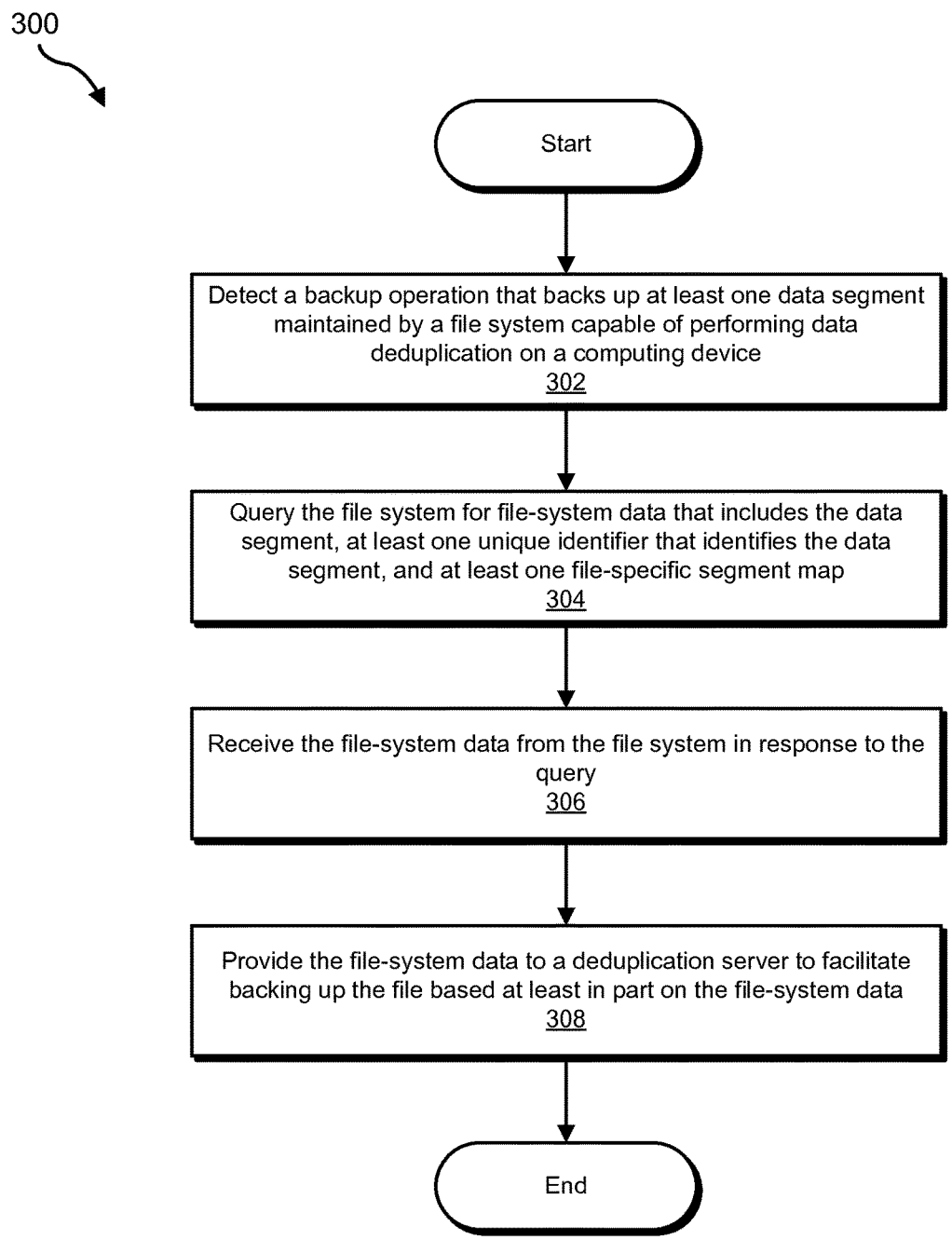
FIG. 3 is a flow diagram of an exemplary method for leveraging data-deduplication capabilities of file systems.

FIG. 3 is a flow diagram of an exemplary computer-implemented method 300 for leveraging data-deduplication capabilities of file systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may detect a backup operation that backs up at least one data segment maintained by a file system capable of performing data deduplication on a computing device. For example, at step 302 detection module 104 may, as part of computing device 202(1) in FIG. 2, detect a backup operation that backs up data segment 122 maintained by file system 130 on computing device 202(1). Examples of this backup operation include, without limitation, full backup operations, incremental backup operations, differential backup operations, accelerated backup operations, deduplicated backup operations, synthetic backup operations, snapshot operations, combinations of one or more of the same, or any other suitable backup operations.

The systems described herein may perform step 302 in a variety of ways. In some examples, detection module 104 may detect the backup operation on computing device 202(1) prior to initiation of the backup operation. For example, detection module 104 may determine an upcoming start time of the backup operation by analyzing a predetermined schedule of backup operations expected to be performed on file system 130. Detection module 104 may then anticipate the initiation of the backup operation based at least in part on the upcoming start time of the backup operation.

Additionally or alternatively, detection module 104 may detect a request to initiate the backup operation on computing device 202(1). For example, server 206 may generate a request to initiate the backup operation on computing device 202(1). Server 206 may then provide the request to initiate the backup operation to computing device 202(1) via network 204. As computing device 202(1) receives the request from server 206, detection module 104 may intercept and/or detect the request.

In some examples, detection module 104 may detect the backup operation on computing device 202(1) after initiation of the backup operation. For example, detection module 104 may monitor the behavior of computing device 202(1) for evidence that the backup operation has already been initiated on computing device 202(1). In this example, while monitoring the behavior of computing device 202(1), detection module 104 may identify at least one process and/or task that indicates and/or suggests that the backup operation is currently in progress.

In some embodiments, the backup operation may represent an incremental backup operation that backs up data segment 122 due at least in part to data segment 122 having changed since the most recent backup operation performed on file system 130. In other embodiments, the backup operation may represent a full backup operation that backs up data segment 122 along with all of the other data segments (not illustrated in FIG. 1) maintained by file system 130.

Returning to FIG. 3, at step 304 one or more of the systems described herein may query the file system for file-system data in response to detecting the backup operation. For example, at step 304 query module 106 may, as part of computing device 202(1) in FIG. 2, query file system 130 for file-system data that facilitates backing up one or more files to server 206 during the backup operation. In this example, query module 106 may initiate the process of querying file system 130 in response to the detection of the backup operation.

The systems described herein may perform step 304 in a variety of ways. In some examples, query module 106 may issue a request for file-system data 120 based at least in part on API 208. For example, provisioning module 108 may provide API 208 by implementing a plugin that extends a pre-existing API of file system 130. In this example, API 208 may include various functions and/or routines that are not provided by the pre-existing API of file system 130.

Examples of these functions and/or routines include, without limitation, functions and/or routines that facilitate setting a unique-identifier algorithm of a file system, querying a file system for the current unique-identifier algorithm, setting a segment size that defines the size of data segments maintained by a file system, querying a file system for the current segment size, querying a file system for data segments to be backed up during backup operations, querying a file system for unique identifiers that identify the data segments, querying a file system for file-specific segment maps that each identify the positioning and/or ordering of one or more of the data segments within a file, querying a file system for unique identifiers that correspond to a volume and/or a list of files, providing a restore data path to the file system, combinations of one or more of the same, or any other suitable functions and/or routines that are not provided by a file system's pre-existing API.

After provisioning module 108 has provided API 208 by implementing the plugin, query module 106 may use API 208 to issue one or more requests to file system 130. For example, query module 106 may use API 208 to issue a request for all unique identifiers that identify data segments that have changed since the most recent backup operation. Additionally or alternatively, query module 106 may use API 208 to issue a request for all unique identifiers that identify data segments maintained by file system 130.

In another example, query module 106 may use API 208 to issue a request for all data segments that have changed since the most recent backup operation. Additionally or alternatively, query module 106 may use API 208 to issue a request for all data segments maintained by file system 130.

In some examples, synchronization module 110 may synchronize file system 130 and server 206 with respect to a unique-identifier algorithm. For example, synchronization module 110 may, as part of computing device 202(1) and/or server 206 in FIG. 2, use API 208 to synchronize file system 130 and server 206 with respect to a unique-identifier algorithm. The phrase "unique-identifier algorithm," as used herein, generally refers to any type or form of process and/or procedure for generating unique identifiers that identify data segments. Examples of this unique-identifier algorithm include, without limitation, Message Digest (MD) algorithms (such as MD5 and/or MD6), Advanced Encryption Standard (AES) algorithms (such as AES-128, AES-192, and/or AES-256), Secure Hash Algorithms (SHAs) (such as SHA-128, SHA-224, SHA-256, SHA-384, and/or SHA-512), combinations of one or more of the same, or any other suitable algorithm.

In one example, synchronization module 110 may identify the unique-identifier algorithm currently used by server 206 to generate and/or interpret unique identifiers that identify data segments. For example, query module 106 may query server 206 to determine the unique-identifier algorithm currently used by server 206. In response to this query, query module 106 may receive a reply that identifies the unique-identifier algorithm currently used by server 206. Query module 106 may then notify synchronization module 110 of the unique-identifier algorithm currently used by server 206.

Upon identifying the unique-identifier algorithm currently used by server 206, synchronization module 110 may set the unique-identifier algorithm of file system 130 to match the unique-identifier algorithm of server 206. For example, synchronization module 110 may use API 208 to issue a request to configure file system 130 with the same unique-identifier algorithm as server 206. By configuring file system 130 with the same unique-identifier algorithm as server 206, synchronization module 110 may ensure that file system 130 and server 206 are able to interpret unique identifiers generated by one another.

Conversely, synchronization module 110 may identify the unique-identifier algorithm currently used by file system 130 to generate and/or interpret unique identifiers that identify data segments. For example, query module 106 may query file system 130 for the unique-identifier algorithm currently used by file system 130. In this example, query module 106 may use API 208 to issue a request to determine the unique-identifier algorithm currently used by file system 130. In response to this request, query module 106 may receive a reply that identifies the unique-identifier algorithm currently used by file system 130. Query module 106 may then notify synchronization module 110 of the unique-identifier algorithm currently used by server 206.

Upon identifying the unique-identifier algorithm currently used by file system 130, synchronization module 110 may set the unique-identifier algorithm of server 206 to match the unique-identifier algorithm of file system 130. For example, synchronization module 110 may issue a request to configure server 206 with the same unique-identifier algorithm as file system 130. By configuring the unique-identifier algorithm of server 206 with the same unique-identifier algorithm as file system 130, synchronization module 110 may ensure that file system 130 and server 206 are able to interpret unique identifiers generated by one another.

Similarly, synchronization module 110 may use API 208 to synchronize file system 130 and server 206 with respect to a specific segment size. The phrase "segment size," as used herein, generally refers to any amount and/or quantity of data that represents the size of data segments generated during data deduplication. This segment size may be fixed or variable. Examples of the segment size include, without limitation, 1 KiloByte (KB), 2 KB, 4 KB, 256 KB, 512 KB, 1 MegaByte (MB), 2 MB, 4 MB, a variable segment size, or any other suitable segment size.

In one example, synchronization module 110 may identify the segment size currently used by server 206 to generate data segments during network-wide data deduplication. For example, query module 106 may query server 206 to determine the segment size currently used by server 206. In response to this query, query module 106 may receive a reply that identifies the segment size currently used by server 206. Query module 106 may then notify synchronization module 110 of the segment size currently used by server 206.

Upon identifying the segment size used by server 206, synchronization module 110 may set the segment size of file system 130 to match the segment size of server 206. For example, synchronization module 110 may use API 208 to issue a request to configure file system 130 with the same segment as server 206. By configuring file system 130 with the same segment size as server 206, synchronization module 110 may ensure that file system 130 and server 206 are able to properly maintain, deduplicate, and/or rehydrate data segments generated by one another.

Conversely, synchronization module 110 may identify the segment size currently used by file system 130 to generate data segments during localized data deduplication. For example, query module 106 may query file system 130 for the segment size currently used by file system 130. In this example, query module 106 may use API 208 to issue a request to determine the unique-identifier algorithm currently used by file system 130. In response to this request, query module 106 may receive a reply that identifies the segment size currently used by file system 130. Query module 106 may then notify synchronization module 110 of the segment size currently used by file system 130.

Upon identifying the segment size currently used by file system 130, synchronization module 110 may set the segment size of server 206 to match the segment size of file system 130. For example, synchronization module 110 may issue a request to configure server 206 with the same segment size as file system 130. By configuring the unique-identifier algorithm of server 206 with the same segment size as file system 130, synchronization module 110 may ensure that file system 130 and server 206 are able to properly maintain, deduplicate, and/or rehydrate data segments generated by one another.

Returning to FIG. 3, at step 306 one or more of the systems described herein may receive the file-system data from the file system in response to the query. For example, at step 306 query module 106 may, as part of computing device 202(1) in FIG. 2, receive file-system data 120 from file system 130 in response to the query. In this example, file-system data 120 may include data segment 122, unique identifier 124 that identifies data segment 122, and/or file-specific segment map 126 that identifies a position of data segment 122 relative to at least one other data segment within a file. File-system data 120 may also include various other data, metadata, and/or information (not illustrated in FIG. 1) that facilitates backing up one or more other files to server 206.

Figure 4:
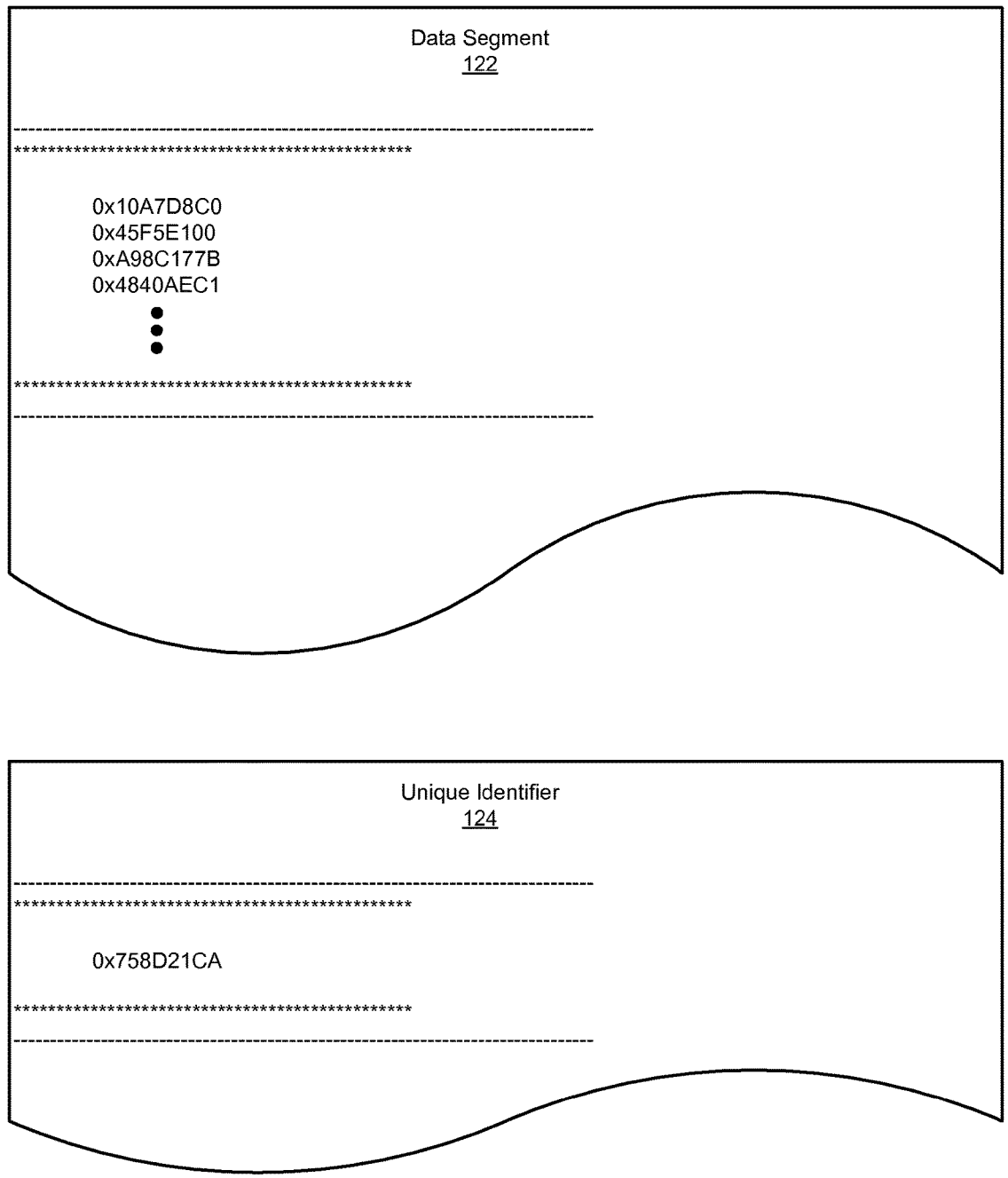
FIG. 4 is an illustration of an exemplary data segment and an exemplary unique identifier that identifies the data segment.

As illustrated in FIG. 4, unique identifier 124 may include a hash (in this example, "0x758D21CA") that uniquely identifies data segment 122 (in this example, "0x10A7D8C0," "0x45F5E100," "0xA98C177B," "0x4840AEC1," and so on). As illustrated in FIG. 5, file-specific segment map 126 may identify a specific file (in this example, "Example.doc"), a positioning and/or ordering of data segments included in the specific file (in this example, "1," "2," "3," "4," and "5"), and the unique identifiers that identify the data segments corresponding to the identified positioning and/or ordering (in this example, "0x473AEC1F," "0xAA219BC3," "0x758D21CA," "0x67BA3210," and "0x8BB1C120").

The systems described herein may perform step 306 in a variety of ways. In some examples, query module 106 may receive file-system data 120 from file system 130 in response to issuing the request for file-system data 120 based at least in part on API 208. For example, query module 106 may receive unique identifier 124 from file system 130 in response to issuing a request for all unique identifiers that identify changed data segments. Additionally or alternatively, query module 106 may receive unique identifier 124 from file system 130 in response to issuing a request for all unique identifiers that identify data segments maintained by file system 130.

Upon receiving unique identifier 124 from file system 130, query module 106 may provide unique identifier 124 to deduplication module 112. By providing unique identifier 124 to deduplication module 112, query module 106 may enable deduplication module 112 to achieve network-wide data deduplication on server 206 without generating a unique identifier that identifies data segment 122. In other words, query module 106 may enable deduplication module 112 to forgo generating a unique identifier that identifies data segment 122 since unique identifier 124 is included in file-system data 120. As a result, query module 106 may help conserve various computing resources (such as processing power and/or computing time) traditionally consumed during network-wide data deduplication.

In some examples, deduplication module 112 may deduplicate at least a portion of file-system data 120 received from file system 130. For example, deduplication module 112 may, as part of computing device 202(1) in FIG. 2, perform client-side data deduplication on file-system data 120. The phrase "client-side data deduplication," as used herein, generally refers to any type or form of network-wide data deduplication performed at a client device (as opposed to a server that stores network-wide data).

Deduplication module 112 may perform such client-side data deduplication on file-system data 120 by determining, at computing device 202(1), which data segments included in file-system data 120 are already stored on server 206. For example, query module 106 may receive a list of unique identifiers that identify all of the changed data segments in response to the query. Provisioning module 108 may then direct computing device 202(1) to provide the list of unique identifiers to server 206 via network 204.

In response to receiving the list of unique identifiers from computing device 202(1), server 206 may retrieve a list of globally unique identifiers that identify all of the data segments already stored on server 206. The phrase "globally unique identifier," as used herein, generally refers to any type or form of unique identifier that identifies a unique data segment included in network-wide data stored on a server.

Server 206 may then provide the list of globally unique identifiers to computing device 202(1) via network 204.

As the list of globally unique identifiers reaches computing device 202(1), query module 106 may receive the list of globally unique identifiers. Upon the reception of the list of globally unique identifiers, deduplication module 112 may identify unique identifier 124 in the list. In response to the identification of unique identifier 124 in the list, deduplication module 112 may keep data segment 122, unique identifier 124, and/or file-specific segment map 126 in file-system data 120.

However, deduplication module 112 may fail to identify one or more other unique identifiers (not illustrated in FIG. 1) in the list. In response to the failure to identify the other unique identifiers in the list, deduplication module 112 may remove the other unique identifiers, one or more corresponding data segments, and/or one or more corresponding file-specific segment maps from file-system data 120.

Alternatively, deduplication module 112 may fail to identify any of the unique identifiers of the changed data segments in the list. In response to the failure to identify any of the unique identifiers of the changed data segments in the list, deduplication module 112 may determine that all of the changed data segments are already stored on server 206. As a result, deduplication module 112 may remove all of the data segments (including, e.g., data segment 122) from file-system data 120. However, deduplication module 112 may keep all of the unique identifiers and file-specific segment maps corresponding to the changed data segments (including, e.g., unique identifier 124 and file-specific segment map 126) in file-system data 120.

Returning to FIG. 3, at step 308 one or more of the systems described herein may provide the file-system data to deduplication server to facilitate backing up the file based at least in part on the file-system data. For example, at step 308 provisioning module 108 may, as part of computing device 202(1) in FIG. 2, provide file-system data 120 to server 206 to facilitate backing up the file based at least in part on the file-system. In this example, provisioning module 108 may initiate the process of providing file-system data 120 to server 206 upon the reception of file-system data 120 from file system 130.

The systems described herein may perform step 308 in a variety of ways. In some examples, provisioning module 108 may direct computing device 202(1) to provide file-system data 120 to server 206 via network 204. In one example, provisioning module 108 may direct computing device 202(1) to provide file-system data 120 to server 206 after deduplication module 112 has performed client-side deduplication at computing device 202(1). In this example, when computing device 202(1) provides file-system data 120 to server 206, file-system data 120 may exclude all of the data segments already stored on server 206.

In another example, provisioning module 108 may direct computing device 202(1) to provide file-system data 120 even though deduplication module 112 has not performed client-side data deduplication at computing device 202(1). In this example, when computing device 202(1) provides file-system data 120 to server 206, file-system data 120 may include all of the data segments that have changed since the most recent backup operation and/or a list of all of the unique identifiers that identify these data segments. In other words, when computing device 202(1) provides file-system data 120 to server 206, file-system data 120 may include one or more data segments already stored on server 206 and/or a list of unique identifiers that identify these data segments.

Continuing with this example, deduplication module 112 may, as part of server 206 in FIG. 2, perform server-side data deduplication on file-system data 120 received from file system 130. The phrase "server-side data deduplication," as used herein, generally refers to any type or form of network-wide data deduplication performed at a server (as opposed to a client device) that stores network-wide data.

Deduplication module 112 may perform such server-side data deduplication on file-system data 120 by determining, at server 206, which data segments included in file-system data 120 are already stored on server 206. For example, deduplication module 112 may compare the list of unique identifiers included in file-system data 120 with the list of globally unique identifiers that identify all of the data segments already stored on server 206. In this example, deduplication module 112 may identify one or more data segments that are duplicated across file-system data 120 received by server 206 and network-wide data 210 stored on server 206. Deduplication module 112 may then deduplicate these data segments at server 206 by refusing to store a duplicate instance of these data segments despite being included in file-system data 120.

In some examples, deduplication module 112 may generate backup 212 at server 206 based at least in part on file-system data 120. For example, deduplication module 112 may deduplicate file-system data 120 with respect to network-wide data 210 and then store a deduplicated version of file-system data 120 as backup 212. By storing the deduplicated version of file-system data 120 as backup 212, deduplication module 112 may enable restore module 116 to restore data segment 122 to file system 130 during a restore operation.

In some examples, restore module 114 may, as part of computing device 202(1) in FIG. 2, restore data segment 122 from backup 212 to file system 130 during a restore operation performed on computing device 202(1). For example, query module 106 may query server 206 for a list of identifiers that identify one or more data segments that need to be restored to file system 130 during the restore operation.

In response to the query, query module 106 may receive the list of identifiers from server 206 via network 204. In one example, this list may include one or more unique identifiers obtained from backup 212 stored on server 206. Additionally or alternatively, the list may include one or more duplicate instances of the unique identifiers obtained from backup 212. For example, the list may include duplicate instances of unique identifier 124.

In one example, query module 106 may use API 208 to provide the list of identifiers to file system 130 and issue a request to return a single instance of each identifier included in the list to restore module 114. Upon receiving the list of identifiers and the request from query module 106, file system 130 may deduplicate the duplicate instances of the unique identifiers included in the list. For example, file system 130 may consolidate the duplicate instances of unique identifier 124 into a single instance of unique identifier 124. File system 130 may add a single instance of each unique identifier that needs to be restored during the restore operation to a list of unique identifiers. File system 130 may then provide this list of unique identifiers to restore module 114 in response to the request.

Upon receiving the list of unique identifiers from file system 130, restore module 114 may identify each unique identifier included in the list. For example, restore module 114 may identify the single instance of unique identifier 124 in the list. In response to identifying the single instance of unique identifier 124, restore module 114 may obtain restore data that includes data segment 122 and file-specific segment map 126 from server 206 based at least in part on unique identifier 124. Restore module 114 may then provide this restore data to file system 130 to facilitate restoring the file based at least in part on the restore data. By providing the restore data to file system 130, restore module 114 may enable file system 130 to rehydrate (or reassemble) the file immediately or on an as-needed basis.

Figure 6:
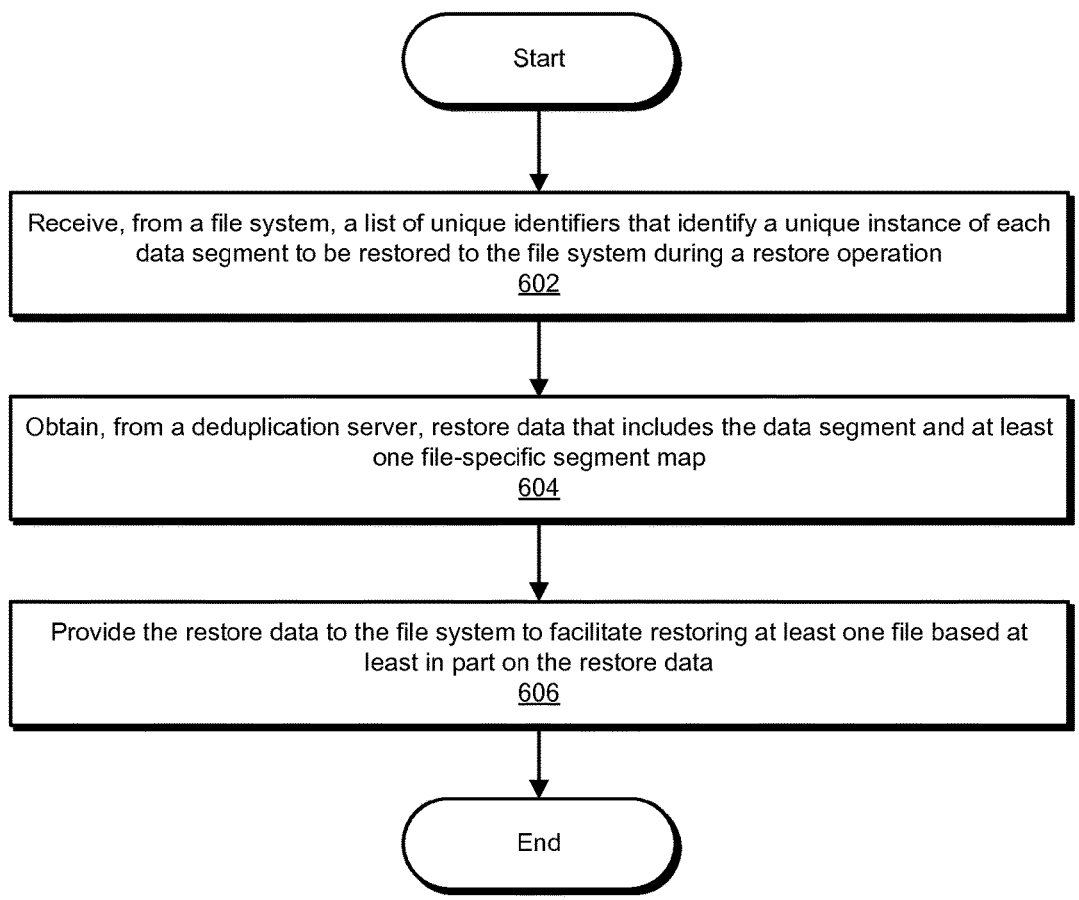
FIG. 6 is a flow diagram of an exemplary method for leveraging data-deduplication capabilities of file systems.

FIG. 6 is a flow diagram of an exemplary computer-implemented method 600 for leveraging data-deduplication capabilities of file systems. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, computing system 710 in FIG. 7, and/or portions of exemplary network architecture 800 in FIG. 8.

As illustrated in FIG. 6, at step 602 one or more of the systems described herein may receive a list of unique identifiers that identify a unique instance of each data segment that needs to be restored to a file system during a restore operation. For example, at step 602 query module 106 may, as part of computing device 202(1) in FIG. 2, receive a list of unique identifiers from file system 130. In this example, the list of unique identifiers may identify a unique instance of each data segment that needs to be restored to file system 130 during a restore operation.

The systems described herein may perform step 602 in a variety of ways. In some examples, query module 106 may query file system 130 for the list of unique identifiers at the outset of the restore operation. For example, query module 106 may issue a request to return a single instance of each identifier included in the list to restore module 114. Query module 106 may then provide this request to file system 130.

Upon receiving the request from query module 106, file system 130 may identify each unique identifier that identifies a data segment that needs to be restored during the restore operation. For example, file system 130 may determine that data segment 122 needs to be restored during the restore operation. In response to determining that data segment 122 needs to be restored, file system 130 may add a single instance of unique identifier 124 to the list of unique identifiers. File system 130 may then provide this list of unique identifiers to restore module 114 in response to the request.

In other examples, query module 106 may query server 206 for a list of identifiers that identify each data segment that needs to be restored to file system 130 during the restore operation. In response to the query, query module 106 may receive the list of identifiers from server 206 via network 204. This list may include duplicate instances of at least one unique identifier (such as unique identifier 124) that identifies a data segment included in backup 212.

In one example, query module 106 may use API 208 to provide the list of identifiers to file system 130 and issue a request to return a single instance of each identifier included in the list to restore module 114. Upon receiving the list of identifiers and the request from query module 106, file system 130 may deduplicate the duplicate instances of the unique identifiers included in the list based at least in part on the file system's deduplication data store. For example, file system 130 may consolidate the duplicate instances of unique identifier 124 into a single instance of unique identifier 124 based at least in part on the file system's deduplication data store. File system 130 may add a single instance of each unique identifier to a list of unique identifiers. File system 130 may then provide this list of unique identifiers to restore module 114 in response to the request.

In another example, query module 106 may provide the list of identifiers to restore module 114. Upon receiving the list of identifiers, restore module 114 may deduplicate the duplicate instances of the unique identifiers included in the list. By deduplicating the duplicate instances of the unique identifiers, restore module 114 may consolidate the list such that the list only includes a single instance of each unique identifier that identifies a data segment that needs to be restored during the restore operation. Restore module 114 may then provide this consolidated list to file system 130.

Returning to FIG. 6, at step 604 one or more of the systems described herein may obtain, from a deduplication server, restore data that includes the data segment and at least one corresponding file-specific segment map. For example, at step 604 restore module 114 may, as part of computing device 202(1) in FIG. 2, obtain restore data from server 206. In this example, the restore data may include data segment 122 and/or file-specific segment map 126. This restore data may also include various other data segments and/or various other file-specific segment maps (e.g., one or more additional file-specific segment maps that reference data segment 122).

The systems described herein may perform step 604 in a variety of ways. In some examples, restore module 114 may direct computing device 202(1) to forward the list of unique identifiers to server 206 via network 204. Upon receiving the list of unique identifiers from computing device 202(1), server 206 may identify unique identifier 124 in the list. Server 206 may then retrieve data segment 122 and file-specific segment map 126 from backup 212 based at least in part on unique identifier 124.

Additionally or alternatively, restore module 114 may issue a request for the data segments identified by the list of unique identifiers. Restore module 114 may then direct computing device 202(1) to provide this request to server 206 via network 204. Upon receiving the request from computing device 202(1), server 206 may identify unique identifier 124 in the request. Server 206 may then retrieve data segment 122 and/or file-specific segment map 126 from backup 212 based at least in part on unique identifier 124.

Upon retrieving data segment 122 and file-specific segment map 126 from backup 212, server 206 may add data segment 122 and/or file-specific segment map 126 to the restore data. Server 206 may then provide this restore data to computing device 202(1) via network 204. As computing device 202(1) receives the restore data from server 206, restore module 114 may obtain the restore data.

Returning to FIG. 6, at step 606 one or more of the systems described herein may provide the restore data to the file system to facilitate restoring the file based at least in part on the restore data. For example, at step 606 restore module 114 may, as part of computing device 202(1) in FIG. 2, provide this restore data to file system 130 to facilitate restoring at least one file that includes data segment 122 based at least in part on the restore data. In this example, the restore data may also facilitate restoring various other files that include various other data segments. By providing this restore data to file system 130, restore module 114 may enable file system 130 to rehydrate (or reassemble) such files immediately or on an as-needed basis.

Although restore module 114 may obtain the data segments together with the file-specific segment maps from server 206 and then provide the data segments together with the file-specific segment maps to file system 130, restore module 114 may also obtain and provide the data segments and file-specific segment maps at separate times. For example, after providing the data segments to file system 130, restore module 114 may issue a separate request for the file-specific segment maps that reference the data segments. Restore module 114 may then direct computing device 202(1) to provide this request to server 206 via network 204.

Upon receiving the request from computing device 202(1), server 206 may retrieve the corresponding file-specific segment maps from backup 212. Server 206 may then provide these file-specific segment maps to computing device 202(1) via network 204. As computing device 202(1) receives the file-specific segment maps from server 206, restore module 114 may provide the file-specific segment maps to file system 130.

As explained above in connection with method 300 in FIG. 3, a backup and restore technology may leverage data-deduplication capabilities of file systems by querying file systems for file-system data that facilitates backing up unique data segments to deduplication servers. For example, an agent of ACRONIS TRUE IMAGE may provide an API that extends a pre-existing API of a file system on a client device. This API may enable the agent to synchronize the client device and a deduplication server with respect to a unique-identifier algorithm and/or a segment size. The agent may use the API to perform this synchronization when the client device configures the agent for the first time.

After performing this synchronization, the agent may use the API to query the file system for hashes of data segments that have changed since the last backup operation. By querying the file system for these hashes, the agent may facilitate data deduplication without generating hashes of the changed data segments. As a result, the agent may help conserve various computing resources (such as processing power and/or computing time) since the agent has no need to generate such hashes.

After receiving the hashes of the changed data segments from the file system, the agent may provide these hashes to the deduplication server. Upon receiving these hashes, the deduplication server may use the hashes to determine which of the changed data segments have not yet been uploaded to the deduplication server (by, e.g., another client device). The deduplication server may then return a list of hashes corresponding to these changed data segments to the agent.

Upon receiving this list of hashes, the agent may use the API to query the file system for the data segments identified by the list of hashes. The agent may also use the API to query the file system for each file-specific segment map that includes any of the hashes identified in the list. The agent may then provide the data segments and each file-specific segment map to the deduplication server to facilitate backing up the files that include the changed data segments.

In the event that one or more of the files need to be restored to the file system, the agent may query the deduplication server for the hashes of the data segments included in the files backed up to the deduplication server. For example, the deduplication server may store a backup of file "F1" that includes sequence of data segments "S1 S2 S3 S2 S2 S4" and file "F2" that includes sequence of data segments "S3-S5-S1-S2-S6." In this example, the deduplication server may provide the hashes of data segments "S1," "S2," "S3," "S4," "S5," and "S6" to the agent on the client device in response to the query.

After receiving the hashes of data segments "S1," "S2," "S3," "S4," "S5," and "S6" from the deduplication server, the agent may provide these hashes to the file system. The file system may then check whether one or more of these hashes already exists in the file system's data store. For example, during this check, the file system may identify the hashes of data segments "S1," "S2," and "S3" in the file system's data store. In response to identifying the hashes of data segments "S1," "S2," and "S3" in the data store, the file system may provide only the hashes of data segments "S4," "S5," and "S6" to the agent.

Upon receiving the hashes of data segments "S4," "S5," and "S6," the agent may query the deduplication server for data segments "S4," "S5," and "S6" based at least in part on these hashes. The deduplication server may provide data segments "S4," "S5," and "S6" to the agent on the client device in response to the query. After receiving data segments "S4," "S5," and "S6" from the deduplication server, the agent may provide these data segments to the file system to facilitate storing these data segments in the file system's data store.

Upon providing data segments "S4," "S5," and "S6" to the file system, the agent may query the deduplication server for segment maps specific to files "F1" and "F2." These segment maps may identify the sequence of data segments "S1 S2 S3 S2 S2 S4" in file "F1" and the sequence of data segments "S3-S5-S1-S2-S6" in file "F2." The deduplication server may provide these segment maps to the agent on the client device in response to the query.

After receiving the segment maps specific to files "F1" and "F2" from the deduplication server, the agent may provide these segment maps to the file system. By providing these segment maps to the file system, the agent may enable the file system to make entries for files "F1" and "F2" based at least in part on the sequences of data segments identified by these segment maps. In addition, by making such entries for files "F1" and "F2," the file system may use the entries to rehydrate (or reassemble) files "F1" and "F2" upon request.

Figure 7:
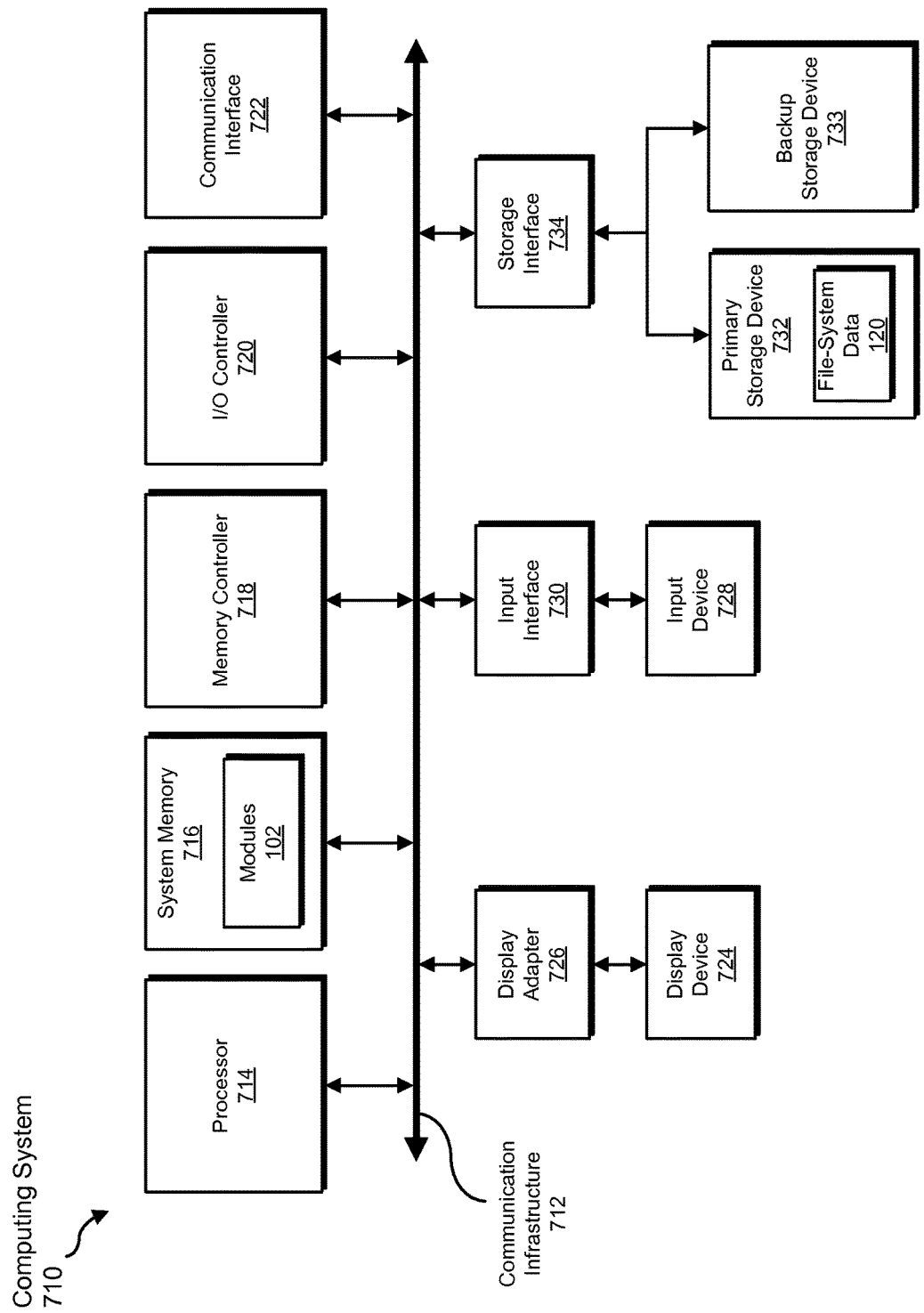
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, file-system data 120 in FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
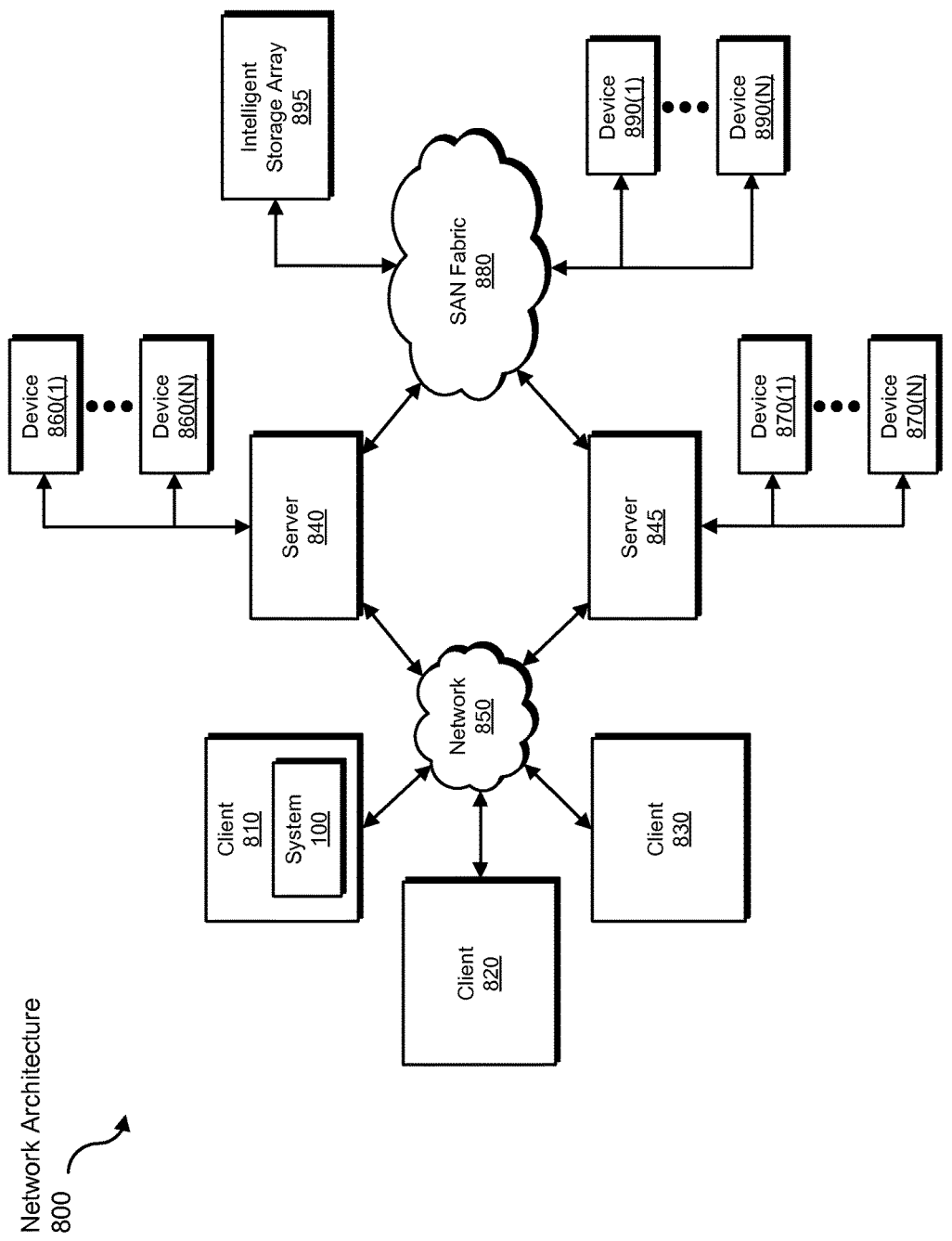
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for leveraging data-deduplication capabilities of file systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive file-system data to be transformed, transform the file-system data, output a result of the transformation to facilitate backing up a file, and then store the result of the transformation to a deduplication server. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for leveraging data-deduplication capabilities of file systems, at least a portion of the method being performed by a computing device comprising at least one processor, the method comprising:
    detecting a backup operation that backs up a plurality of data segments within a file maintained by a file system capable of performing data deduplication on a computing device;
    querying, in response to detecting the backup operation, the file system via an Application Programming Interface (API) for file-system data that includes:
        the plurality of data segments within the file to be backed up during the backup operation;
        a plurality of hashes that identify the plurality of data segments within the file, wherein each of the plurality of hashes comprises a hash generated by the file system;
        at least one file-specific segment map that maps an ordering of the plurality of data segments within the file to the plurality of hashes;
        a segment size of the plurality of data segments within the file maintained by the file system; and
        an identification of a Media Digest algorithm used by the file system to generate the plurality of hashes;
    receiving, in response to the query, the file-system data from the file system;
    upon receiving the file-system data from the file system, providing the file-system data to a deduplication server to facilitate backing up the file based at least in part on the file-system data; and
    synchronizing, prior to backing up the file, the segment size and the Media Digest algorithm used by the file system and the deduplication server based on the segment size and the identification of the Media Digest algorithm in the file-system data provided via the API to enable the deduplication server to interpret the plurality of hashes generated by the file system.

2. The method of claim 1, wherein synchronizing the file system and the deduplication server comprises synchronizing the file system and the deduplication server with respect to a segment size that defines a size of each of the plurality of data segments.

3. The method of claim 1, further comprising providing the API to enable a server to query the file system for the file-system data, wherein querying the file system for the file-system data comprises issuing a request for the file-system data based at least in part on the API.

4. The method of claim 3, wherein providing the API comprises implementing a plugin that extends a pre-existing API of the file system.

5. The method of claim 1, wherein detecting the backup operation that backs up the plurality of data segments comprises at least one of:
    detecting an incremental backup operation that backs up the plurality of data segments due at least in part to at least one change that occurred in the plurality of data segments since a most recent backup operation performed on the file system; and
    detecting a full backup operation that backs up the plurality of data segments along with all other data segments maintained by the file system.

6. The method of claim 1, wherein querying the file system comprises querying the file system to identify each data segment that has changed since a most recent backup operation performed on the file system.

7. The method of claim 1, wherein receiving the file-system data from the file system comprises forgoing generating the plurality of hashes from the plurality of data segments due at least in part to the plurality of hashes being included in the file-system data received from the file system.

8. The method of claim 1, further comprising deduplicating, prior to providing the file-system data to the deduplication server, at least a portion of the file-system data with respect to network-wide data stored on the deduplication server.

9. The method of claim 8, wherein:
    deduplicating the portion of the file-system data with respect to the network-wide data stored on the deduplication server comprises:
        providing, to the deduplication server, a list of hashes that identify one or more data segments that have changed since a most recent backup operation performed on the file system;
        receiving, from the deduplication server, a list of globally unique hashes that identify one or more of the changed data segments as not yet having been updated at the deduplication server; and
        identifying, in the list of globally unique hashes, the plurality of hashes that identify the plurality of data segments to be backed up during the backup operation; and
    providing the file-system data to the deduplication server comprises providing, in response to identifying the plurality of hashes in the list of globally unique hashes, the plurality of data segments and the file-specific segment map to the deduplication server to facilitate backing up the file.

10. The method of claim 1, wherein:
    providing the file-system data to the deduplication server comprises enabling the deduplication server to deduplicate at least a portion of the file-system data by:
        comparing the plurality of hashes included in the file-system data with a list of globally unique hashes that identify one or more data segments already stored at the deduplication server;
        identifying, based at least in part on the comparison, at least one data segment that is duplicated across the data segments included in the file-system data and the data segments already stored at the deduplication server; and deduplicating the data segment at the deduplication server by refusing to store a duplicate instance of the data segment despite being included in the file-system data.

11. The method of claim 1, further comprising restoring the plurality of data segments to the file system during a restore operation by:
receiving, from the deduplication server, a list of hashes that identify one or more data segments that need to be restored to the file system during the restore operation;
providing the list of hashes to the file system;
receiving, from the file system in response to providing the list of hashes to the file system, another list of hashes that identify a single instance of each data segment to be restored to the file system during the restore operation;
identifying, in the other list of hashes, the plurality of hashes that identifies the plurality of data segments backed up during the backup operation;
obtaining, from the deduplication server in response to identifying the plurality of hashes, restore data that includes:
the plurality of data segments backed up during the backup operation; and
the file-specific segment map that identifies, based at least in part on the plurality of hashes, the ordering of the plurality of data segments within the file; and
upon obtaining the restore data from the deduplication server, providing the restore data to the file system to facilitate restoring the file based at least in part on the restore data.

12. A system for leveraging data-deduplication capabilities of file systems, the system comprising:
a detection module, stored in memory, that detects a backup operation that backs up a plurality of data segments within a file maintained by a file system capable of performing data deduplication on a computing device;
a query module, stored in memory, that:
queries, in response to the detection of the backup operation, the file system via an Application Programming Interface (API) for file-system data that includes:
the plurality of data segments within the file to be backed up during the backup operation;
a plurality of hashes that identify the plurality of data segments within the file, wherein each of the plurality of hashes comprises a hash generated by the file system;
at least one file-specific segment map that maps an ordering of the plurality of data segments within the file to the plurality of hashes;
a segment size of the plurality of data segments within the file; and
an identification of a Media Digest algorithm used by the file system to generate the plurality of hashes;
receives, in response to the query, the file-system data from the file system;
a provisioning module, stored in memory, that provides the file-system data to a deduplication server to facilitate backing up the file based at least in part on the file-system data;
a synchronization module, stored in memory, that synchronizes, prior to backup of the file, the segment size and the Media Digest algorithm used by the file system and the deduplication server based on the segment size and the identification of the Media Digest algorithm in the file-system data provided via the API to enable the deduplication server to interpret the plurality of hashes generated by the file system; and
at least one physical processor configured to execute the detection module, the query module, the provisioning module, and the synchronization module.

13. The system of claim 12, wherein:
the provisioning module further provides the API to enable a server to query the file system for the file-system data; and
the query module issues a request for the file-system data based at least in part on the API.

14. The system of claim 12, wherein the file-system data further comprises the data segment to be backed up during the backup operation; and
further comprising a deduplication module that deduplicates at least a portion of the file-system data with respect to network-wide data stored on the deduplication server.

15. The system of claim 14, wherein:
the provisioning module further provides, to the deduplication server, a list of hashes that identify one or more data segments that have changed since a most recent backup operation performed on the file system;
the query module further receives, from the deduplication server, a list of globally unique hashes that identify one or more of the changed data segments as not yet having been updated at the deduplication server;
the deduplication module further identifies, in the list of globally unique hashes, the plurality of hashes that identify the plurality of data segments to be backed up during the backup operation; and
the provisioning module further provides, in response to the identification of the plurality of hashes in the list of globally unique hashes, the plurality of data segments and the file-specific segment map to the deduplication server to facilitate backing up the file.

16. The system of claim 12, wherein:
the provisioning module further enables the deduplication server to deduplicate at least a portion of the file-system data by:
comparing the plurality of hashes included in the file-system data with a list of globally unique hashes that identify one or more data segments already stored at the deduplication server;
identifying, based at least in part on the comparison, at least one data segment that is duplicated across the data segments included in the file-system data and the data segments already stored at the deduplication server; and
deduplicating the data segment at the deduplication server by refusing to store a duplicate instance of the data segment despite being included in the file-system data.

17. The system of claim 12,
further comprising a restore module that restores the plurality of data segments to the file system during a restore operation by:
receiving, from the deduplication server, a list of hashes that identify one or more data segments that need to be restored to the file system during the restore operation;
providing the list of hashes to the file system;
receiving, from the file system in response to providing the list of hashes to the file system, another list of hashes that identify a single instance of each data segment to be restored to the file system during the restore operation;

identifying, in the other list of hashes, the plurality of hashes that identifies the plurality of data segments backed up during the backup operation;

obtaining, from the deduplication server in response to identifying the plurality of hashes, restore data that includes:

the plurality of data segments backed up during the backup operation; and the file-specific segment map that identifies, based at least in part on the plurality of hashes, the ordering of the plurality of data segments within the file; and upon obtaining the restore data from the deduplication server, providing the restore data to the file system to facilitate restoring the file based at least in part on the restore data.

18. A non-transitory computer-readable-storage medium comprising one or more computer-executable instructions that, when executed by at least one processor of a computing device, cause the computing device to:

detect a backup operation that backs up a plurality of data segments within a file maintained by a file system capable of performing data deduplication on a computing device;

query, in response to detecting the backup operation, the file system via an Application Programming Interface (API) for file-system data that includes:

the plurality of data segments within the file to be backed up during the backup operation;

a plurality of hashes that identify the plurality of data segments within the file, wherein each of the plurality of hashes comprises a hash generated by the file system;

at least one file-specific segment map that maps an ordering of the plurality of data segments within the file to the plurality of hashes;

a segment size of the plurality of data segments within the file; and an identification of a Media Digest algorithm used by the file system to generate the plurality of hashes;

receive, in response to the query, the file-system data from the file system;

provide, upon receiving the file-system data from the file system, the file-system data to a deduplication server to facilitate backing up the file based at least in part on the file-system data; and synchronize, prior to backing up the file, the segment size and the Media Digest algorithm used by the file system and the deduplication server based on the segment size and the identification of the Media Digest algorithm in the file-system data provided via the API to enable the deduplication server to interpret the plurality of hashes generated by the file system.

\* \* \* \* \*